(No Model.)

H. COHEN & J. W. THARP.
NUT LOCK.

No. 504,561. Patented Sept. 5, 1893.

WITNESSES:
Donn Twitchell
C. Sedgwick

INVENTORS
H. Cohen
J. W. Tharp
BY Munn & Co
ATTORNEYS.

UNITED STATES PATENT OFFICE.

HENRY COHEN AND JOHN W. THARP, OF MEMPHIS, TENNESSEE.

NUT-LOCK.

SPECIFICATION forming part of Letters Patent No. 504,561, dated September 5, 1893.

Application filed March 11, 1893. Serial No. 465,523. (No model.)

*To all whom it may concern:*

Be it known that we, HENRY COHEN and JOHN W. THARP, both of Memphis, in the county of Shelby and State of Tennessee, have invented a new and useful Improvement in Nut-Locks, of which the following is a full, clear, and exact description.

Our invention relates to improvements in nut locks for railway joint bolts and other like purposes, and consists in the peculiar construction and combination of parts, as is hereinafter described and claimed.

Reference is to be had to the accompanying drawings, forming a part of this specification, in which similar letters of reference indicate corresponding parts in all the figures.

Figure 1:
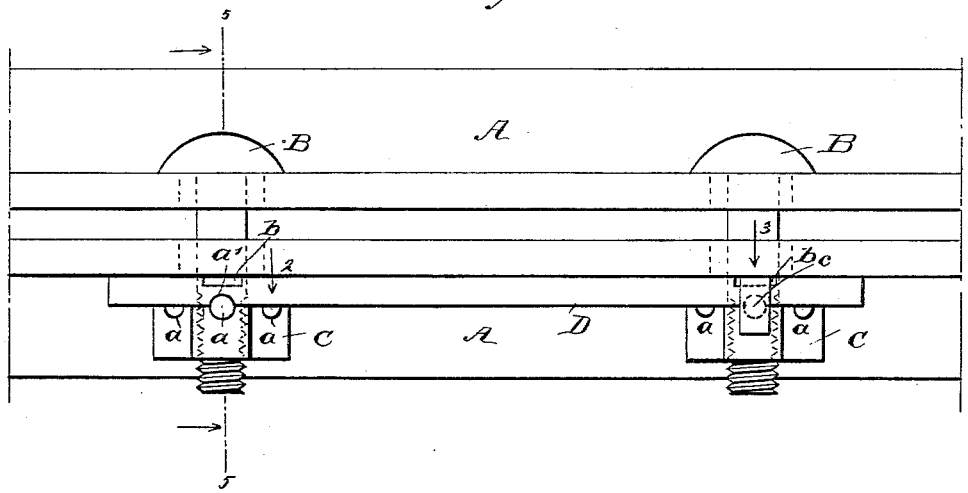
Figure 2:
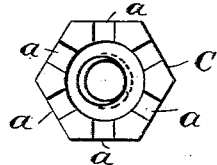
Figure 3:
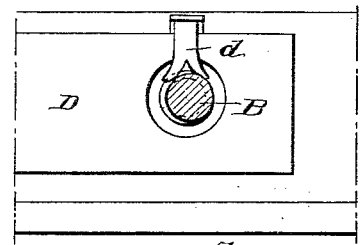
Figure 4:
Figure 5:
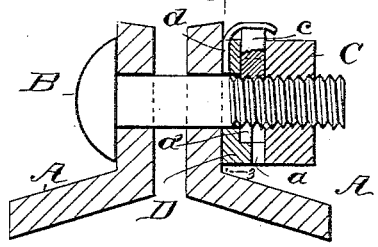
Figure 6:
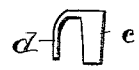
Figure 7:
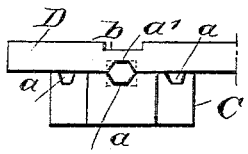

Figure 1 is a plan view in part, of two fish plates for a railway joint, and the improvement applied thereto. Fig. 2 is a side view of a nut having a feature of the improvement, seen opposite the arrow 2, in Fig. 1. Fig. 3 is a longitudinal sectional view on the line 3—3 in Fig. 5, and opposite the arrow 3, in Fig. 1. Fig. 4 is a detached view of a detail of construction which is part of the improvement. Fig. 5 is a transverse sectional view of the assembled parts shown in Fig. 1, on the line 5—5 in said figure. Fig. 6 is a detached side view of the novel detail shown in Fig. 4; and Fig. 7 is a plan view in part of features of the improvement.

The fish plates A may be of any approved construction, and as shown, are preferably employed in pairs, their vertical walls being adapted to embrace the adjacent ends of two aligned track rails, said plates being oppositely perforated at a proper distance apart, for the reception of the bolts B, that are inserted through both fish plates and the webs of the rails to be connected near their joints, not shown.

The like nuts C for the bolts B are made either square, edge-wise, or hexagonal as represented in Fig. 2, and on the face of each nut which in service is nearest to the fish plate, a number of radial grooves $a$, are formed of a proper depth. The grooves $a$ may be square cornered, or semi-circular as indicated in Fig. 1, or be given any other form that is suitable, as for instance these radial indentations in the side of the nut, may be hexagonal, as represented in Fig. 7, by full lines.

A locking plate D, is a feature of the invention, comprising an elongated metal strip rectangular in cross section, and of a suitable length for its use. Said plate is perforated at such points as will permit it to slide loosely upon the threaded projecting portions of the bolts B, when the parts are to be assembled for service.

There is a groove $a'$, cut or pressed in the side of the locking plate D, opposite each nut C, said grooves $a'$ being vertical when the plate is in position on the bolts B, and each is adapted to make a vertical groove $a$, in the adjacent face of the nut when the latter is screwed upon the bolt it engages, so as to have an impinging contact with the outer surface of the locking plate, the opposite pairs of grooves $a$, $a'$, producing two circular or hexagonal holes which extend downwardly and intersect the threaded holes in the nuts and the bolt holes in the locking plate.

On the side of the locking plate D, that has contact with the vertical face of one of the fish plates A, a shallow rectangular vertical channel $b$, is formed, opposite each of the grooves $a'$ therein, and extends downwardly so as to intersect the transverse bolt hole below it.

A locking pin $c$, for each nut C is another feature of the invention, and consists of a metal plug shaped to fit the hole produced jointly in the locking plate and nut-face by the grooves $a$, $a'$, which are opposite when the nut C is screwed on the bolt B, so as to tightly compress the fish plates A upon the intervening track rails.

The body of the pin $c$, is provided with a keeper wing $d$, that may be integral, or separate therefrom; when these parts $c$, $d$, are in one piece, the wing is laterally projected from the top of the pin, and then at a proper distance therefrom is bent to lie in a plane nearly parallel with it, as shown in Fig. 6. The keeper wing is by preference furcated at its free end, thus producing two limbs thereon, equally dividing the flat and comparatively thin body of the wing, which in width and thickness is proportioned to fit loosely in the vertical slot produced by the channel $b$, when the locking plate is clamped on the fish plate A. To lock the nuts C, by means of the pins $c$ and their wings $d$, said pins are each driven into a hole produced by the junction of the grooves $a$, $a'$, as before explained, the proper groove $a$, being such an one as will lie opposite the groove $a'$ when the nut has been screwed with force against the locking plate D. When the pin $c$ is introduced into the hole, the depending portion of the wing $d$, is entered in the slot or channel $b$, formed to receive it, so that the act of driving the pin $c$ into the holes $a$, $a'$, will insert the wing, until the pin bears upon the bolt B, and if the wing $d$ is furcated, its length should be so proportioned that its limbs will be spread apart sufficiently when the pin is fully inserted, to lock the pin and wing in place, it being understood that the pieces $c$, $d$, are made of metal sufficiently ductile to permit the limbs of the wing to be spread without injury thereto. If preferred, the wing $d$, may be made separate and be introduced in an appropriate slot or channel $b$, after the pin body has been driven completely into its receiving holes $a$, $a'$, the upper portion of the wing being then bent to lie upon the head of the pin, as shown in Fig. 5, and prevent it from working out; it being understood, that if the wing or key $d$, is separate from the pin body $c$, the lower end of the piece $d$, must be furcated to allow this end to be interlocked with the bolt hole wall as indicated in Fig. 3. It will be seen that the use of the winged pins $c$, if made of rigid metal, will prevent any retrograde movement of the nuts C, until the pins are removed, but preferably the pins and wings are formed from lead or other soft metal, so that to remove the nuts C from the bolts B, a lever wrench of proper length applied with force in a proper direction, will split the pins and bend the wings; then the nuts may be unscrewed without injury to them or the bolt threads.

Having thus fully described our invention, we claim as new and desire to secure by Letters Patent—

1. In a nut lock, a locking plate radially grooved from a bolt-hole therein, and channeled oppositely from said groove, a pin adapted to interlock with a hole formed partly in the face of the nut and completed by the groove in the locking plate, and an integral bent wing plate that engages the channel in the locking plate when the pin is inserted, substantially as described.

2. In a nut lock, a locking device comprising a pin, and a bent wing plate furcated at its lower end and engaging the top of the pin, and adapted to fill a channel in a locking plate strung on the screw bolt having the nut thereon, when the pin is fully inserted in a hole formed jointly in the adjacent faces of the nut and locking plate, substantially as described.

3. In a nut lock, the combination with a screw bolt uniting two perforated fish plates, a locking plate on the projected end of the bolt, and a nut radially grooved in the face which bears on the locking plate, of a mating groove in said locking plate, a channel in the opposite face of said plate, a locking pin, and a wing plate connected to the upper end of the pin, bent laterally and downwardly therefrom and entering the channel when the pin is inserted in the hole produced by the junction of the groove in the locking plate and a radial groove in the face of the nut, substantially as shown and described.

HENRY COHEN.
JOHN W. THARP.

Witnesses:
J. F. FISCHER,
P. M. VACCARO.